(12) United States Patent
Katoh

(10) Patent No.: US 8,471,949 B2
(45) Date of Patent: Jun. 25, 2013

(54) FOCUS-ADJUSTMENT SIGNAL GENERATING APPARATUS AND METHOD, AND IMAGING APPARATUS AND METHOD, WITH MANUAL FOCUS ADJUSTMENTS

(75) Inventor: Hideo Katoh, Yokohama (JP)

(73) Assignee: JVC Kenwood Corporation, Yokohama-Shi, Kanagawa (JP)

(*) Notice: Subject to any disclaimer, the term of this patent is extended or adjusted under 35 U.S.C. 154(b) by 105 days.

(21) Appl. No.: 13/119,000

(22) Filed: May 31, 2011

(65) Prior Publication Data
US 2011/0228161 A1 Sep. 22, 2011

Related U.S. Application Data

(63) Continuation of application No. 12/005,517, filed on Dec. 27, 2007, now Pat. No. 8,023,037.

(30) Foreign Application Priority Data

Dec. 28, 2006 (JP) ................................. 2006-354879
Aug. 10, 2007 (JP) ................................. 2007-209821

(51) Int. Cl.
*H04N 5/232* (2006.01)
(52) U.S. Cl.
USPC ...................................... 348/345; 348/223.1

(58) Field of Classification Search
USPC ................................................ 348/345, 223.1
See application file for complete search history.

(56) References Cited

U.S. PATENT DOCUMENTS

| | | | | |
|---|---|---|---|---|
| 5,920,654 A | * | 7/1999 | Someya et al. | 382/270 |
| 2001/0036361 A1 | * | 11/2001 | Suda | 396/111 |
| 2007/0070005 A1 | * | 3/2007 | Okamura | 345/88 |

* cited by examiner

*Primary Examiner* — Usman Khan
(74) *Attorney, Agent, or Firm* — Renner, Kenner, Greive, Bobak, Taylor & Weber

(57) ABSTRACT

A focus-adjustment signal generating apparatus includes a filter to extract a high-frequency component at a specific frequency or higher from a luminance signal of an input video signal, a comparator to compare an absolute value of the high-frequency component with a specific reference value, to output a first detection signal when the absolute value is equal to or larger than the reference value whereas a second detection signal when the absolute value is smaller than the reference value, an extender to extend an output period of the first detection signal according to a period indicated by a period-length setting signal, to output an extended first detection signal, and a selector to select a first chrominance difference signal indicating a specific color in response to the extended first detection signal whereas a second chrominance difference signal indicating an achromatic color in response to the second detection signal, the first or the second chrominance difference signal being output as a focus-adjustment signal.

6 Claims, 8 Drawing Sheets

FOCUS-ADJUSTMENT SIGNAL GENERATING APPARATUS AND METHOD, AND IMAGING APPARATUS AND METHOD, WITH MANUAL FOCUS ADJUSTMENTS

CROSS-REFERENCE TO RELATED APPLICATIONS

This application is a continuation of U.S. patent application Ser. No. 12/005,517 filed Dec. 27, 2007 now U.S. Pat. No. 8,023,037.

This application is based on and claims the benefit of priority from the prior Japanese Patent Application Nos. 2006-354879 filed on Dec. 28, 2006 and 2007-209821 filed on Aug. 10, 2007, the entire contents of which are incorporated herein by reference.

BACKGROUND OF THE INVENTION

The present invention relates to a focus-adjustment signal generating apparatus and method for generating a video signal which is displayed on a view finder (VF), a liquid crystal display (LCD), etc., for manual focus adjustments, an imaging apparatus, such as a video camera and an electronic still camera, equipped with such a focus-adjustment signal generating apparatus, and an imaging method combined with such a focus-adjustment signal generating method.

Recent video cameras and electronic still cameras offer higher-resolution images. Nevertheless, VF and LCD offer lower image resolution to users when users check the images to be taken through the VF or LCD. This is because of limited VF or LCD sizes in compact video cameras or electronic still cameras. Such lower image resolution on VF or LCD renders focus adjustments difficult for users while viewing images through VF or LCD.

A known focus-adjustment signal generating apparatus is disclosed, for example, in Japanese Un-examined Patent Publication No. 2006-58683, for easier focus adjustments with clear images through VF or LCD. The known apparatus displays an image of an object on VF or LCD with edge processing. The edge processing is performed as follows: A luminance signal is extracted from an input video signal of the object. An R (red) signal, a G (green) signal and a B (blue) signal, or the three primary color signals (RGB signals), are generated based on the luminance signal. The luminance signal is subjected to high-pass filtering to output high-frequency components in the horizontal, vertical and diagonal directions. The high-frequency components in the horizontal, vertical and diagonal directions are added to the R signal, the G signal and the B signal, respectively, to put a specific color on the image of the object at the high-frequency components.

Accordingly, the known focus-adjustment signal generating apparatus offers an image of an object on VF or LCD with a specific color on edge portions of the image. Focus adjustment is performed to make the specific color darker for sharper edge portions. This offers easier focus adjustments with clear images through VF or LCD.

In such known focus-adjustment signal generating apparatus, the difference between the resolution of a video signal gained through image taking and that of VF or LCD forces a focus-adjustment signal to lose high-frequency components when generated after down-conversion, resulting in an incorrect focus-adjustment signal. It is thus required to generate the focus-adjustment signal before down-conversion when the resolution is different between the video signal and VF or LCD. The difference in resolution occurs, for example, when a high-resolution high-vision (HD) signal gained through image taking is down-converted to a standard-resolution standard (SD) signal on VF or LCD.

In the entire camera system, signals to be processed around a down converter are not an RGB signal but luminance and chrominance difference signals for most video cameras and electronic still cameras. The RGB signal to be used in generation of a focus-adjustment signal is processed in a later stage in the entire camera system, compared to the luminance and chrominance difference signals in VF or LCD in the known focus-adjustment signal generating apparatus described above. The generation of a focus-adjustment signal thus requires an RGB converter in a later stage in the entire camera system, causing the system processing redundant.

The high-frequency components of the luminance signal required for generation of a focus-adjustment signal correspond to the edge portions of an image. A lower area ratio of the edge portions to the image could force a down-converted focus-adjustment signal to lose such high-frequency components. Thus, no processing to the image edge portions very likely cause inaccurate focus adjustments.

Moreover, extraction of high-frequency components from a luminance signal at a fixed reference level cannot give a dynamic focus-adjustment signal due to change in the ratio of low- to high-frequency components depending on images.

SUMMARY OF THE INVENTION

A purpose of the present invention is to provide a focus-adjustment signal generating apparatus and method and an imaging apparatus and method that can generate a dynamic focus-adjustment signal even when the resolution is different between a video signal gained through image taking and that to be displayed, without loss of high-frequency components at the edge portions of images after down conversion irrespective of difference in images and with no redundancy of system processing, thus offering easier focus adjustments.

The present invention provides a focus-adjustment signal generating apparatus comprising: a filter to extract a high-frequency component at a specific frequency or higher from a luminance signal of an input video signal; a comparator to compare an absolute value of the high-frequency component with a specific reference value, to output a first detection signal when the absolute value is equal to or larger than the reference value whereas a second detection signal when the absolute value is smaller than the reference value; an extender to extend an output period of the first detection signal according to a period indicated by a period-length setting signal, to output an extended first detection signal; and a selector to select a first chrominance difference signal indicating a specific color in response to the extended first detection signal whereas a second chrominance difference signal indicating an achromitic color in response to the second detection signal, the first or the second chrominance difference signal being output as a focus-adjustment signal.

Moreover, the present invention provides an imaging apparatus comprising: a video signal generator to take an image of an object and generate a video signal carrying the image; a filter to extract a high-frequency component at a specific frequency or higher from a luminance signal of the input video signal; a comparator to compare an absolute value of the high-frequency component with a specific reference value, to output a first detection signal when the absolute value is equal to or larger than the reference value whereas a second detection signal when the absolute value is smaller than the reference value; a selector to select a first chrominance difference signal indicating a specific color in response to the first detection signal whereas a second chrominance difference signal indicating an achromatic color in response to the second detection signal, the first or the second chrominance difference signal being output as a focus-adjustment signal; a down converter to down-convert the focus-adjustment signal by decreasing at least either the number of lines in a vertical direction or the number of pixels in a horizontal direction of the focus-adjustment signal; and a display to display an image of the object with the specific color at an edge portion of the image.

Moreover, the present invention provides a focus-adjustment signal generating method comprising the steps of: extracting a high-frequency component at a specific frequency or higher from a luminance signal of an input video signal; comparing an absolute value of the high-frequency component with a specific reference value, to output a first detection signal when the absolute value is equal to or larger than the reference value whereas a second detection signal when the absolute value is smaller than the reference value; extending an output period of the first detection signal according to a period indicated by a period-length setting signal, to output an extended first detection signal; and selecting a first chrominance difference signal indicating a specific color in response to the extended first detection signal whereas a second chrominance difference signal indicating an achromatic color in response to the second detection signal, the first or the second chrominance difference signal being output as a focus-adjustment signal.

Furthermore, the present invention provides an imaging method comprising the steps of: taking an image of an object and generating a video signal carrying the image; extracting a high-frequency component at a specific frequency or higher from a luminance signal of the input video signal; comparing an absolute value of the high-frequency component with a specific reference value, to output a first detection signal when the absolute value is equal to or larger than the reference value whereas a second detection signal when the absolute value is smaller than the reference value; selecting a first chrominance difference signal indicating a specific color in response to the first detection signal whereas a second chrominance difference signal indicating an achromatic color in response to the second detection signal, the first or the second chrominance difference signal being output as a focus-adjustment signal; down-converting the focus-adjustment signal by decreasing at least either the number of lines in a vertical direction or the number of pixels in a horizontal direction of the focus-adjustment signal; and displaying an image of the object with the specific color at an edge portion of the image.

DETAILED DESCRIPTION OF PREFERRED EMBODIMENTS

Embodiments of the present invention will be described with reference to drawings.

[First Embodiment]

Figure 1:
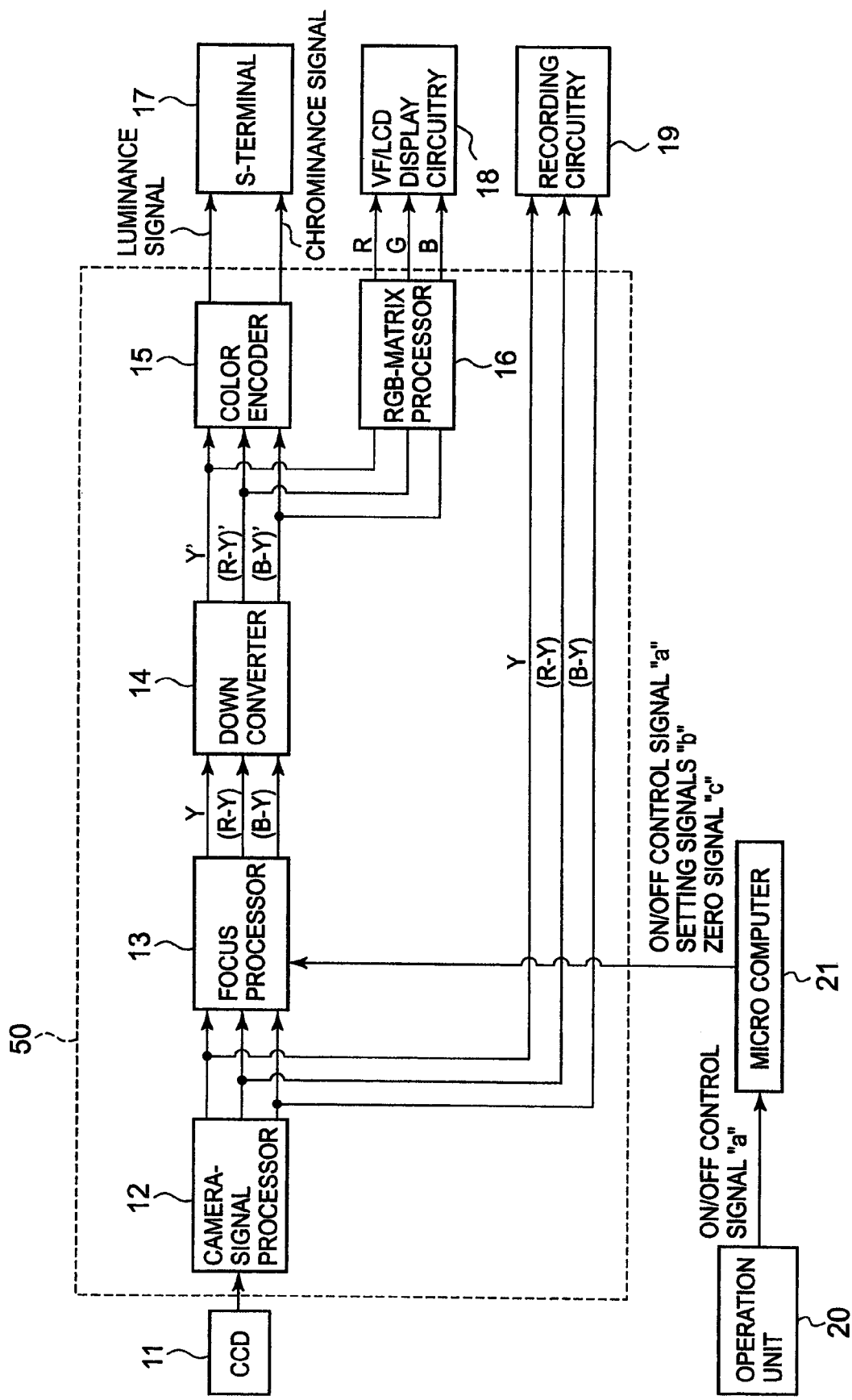
FIG. 1 shows a block diagram of a first embodiment of an imaging apparatus according to the present invention.

FIG. 1 shows a block diagram of a first embodiment of an imaging apparatus according to the present invention.

Employed as an image pick-up device is a CCD (Charge Coupled Device) 11 in FIG. 1. The CCD 11 converts incident light from an object (not shown) into a high-resolution HD signal through photoelectric conversion.

The HD signal is supplied to a camera-signal processor 12. The processor 12 generates a luminance signal Y and two types of chrominance difference signals (R-Y) and (R-B). These signals are supplied to a focus processor 13 and also recording circuitry 19.

The luminance signal Y and the chrominance difference signals (R-Y) and (R-B) subjected to specific processing (which will be described layer) at the focus processor 13 are supplied to a down converter 14.

The down converter 14 down-converts the luminance signal Y and the chrominance difference signals (R-Y) and (R-B) in an HD-signal range into a luminance signal Y' and chrominance difference signals (R-Y)' and (R-B)' in an SD-signal range. Down conversion here is to decrease at least either the number of lines in the vertical direction or the number of pixels in the horizontal direction for each signal. The luminance signal Y' and the chrominance difference signals (R-Y)' and (R-B)' are supplied to a color encoder 15 and also an RGB-matrix processor 16.

The color encoder 15 encodes the luminance signal Y' and the chrominance difference signals (R-Y)' and (R-B)' into a luminance signal and an chrominance signal, respectively, which are then output via an S-terminal 17.

The RGB-matrix processor 16 converts the luminance signal Y' and the chrominance difference signals (R-Y)' and (R-B)' into R, G and B (RGB) signals according to a specific matrix operation. The RGB signals for the three primary colors are supplied to VF/LCD display circuitry 18 for displaying images.

The camera-signal processor 12, the focus processor 13, the down converter 14, the color encoder 15 and the RGB-matrix processor 16 constitute a camera-processing LSI (Large Scale Integrated Circuit) 50.

Disclosed next in detail is the focus processor 13 (a focus-adjustment signal generating apparatus).

The focus processor 13 generates a focus-adjustment signal by means of an HD signal so that a luminance signal does not lose high-frequency components at down conversion. This aims for highly accurate generation of focus-adjustment signal. The focus processor 13 is located before the down converter 14 in the entire camera system, as shown in FIG. 1.

Figure 2:
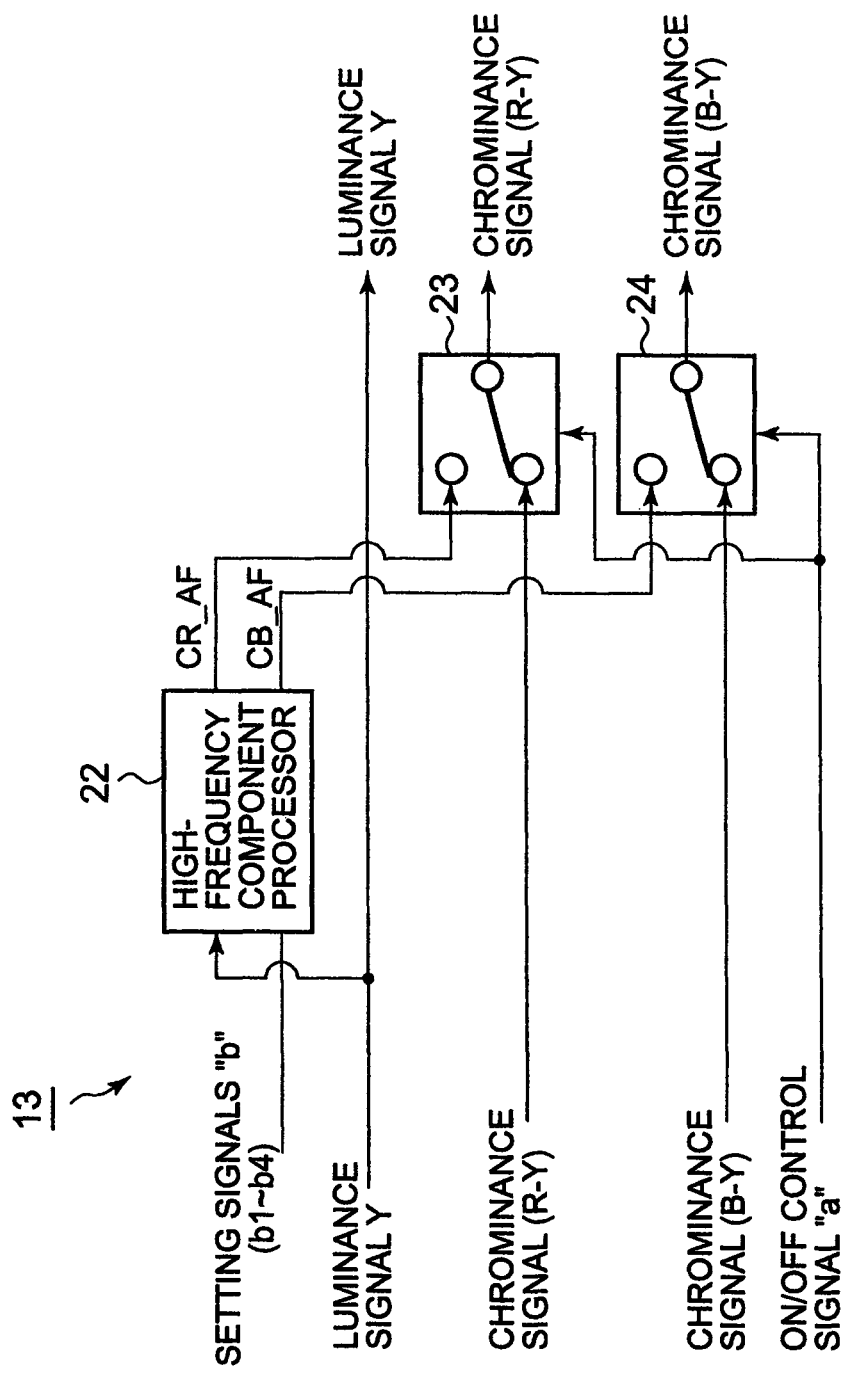
FIG. 2 shows an exemplary block diagram of a focus processor shown in FIG. 1.

FIG. 2 shows an exemplary block diagram of the focus processor 13. The focus processor 13 is equipped with a high-frequency component processor 22 and switching circuits 23 and 24.

Several setting signals "b" (b1 to b4) are supplied to the high-frequency component processor 22 from a micro computer 21 (FIG. 1). The high-frequency component processor 22 applies a specific processing (which will be described later) to the luminance signal Y supplied from the camera-signal processor 12 (FIG. 1) to generate chrominance difference signals (CB_AF) and (CR_AF) based on the setting signals "b" (b1 to b4).

Signals selected by the switching circuits 23 and 24 are switched according to an on/off control signal "a" sent by the micro computer 21. In detail, the switching circuit 23 selects and outputs either the chrominance difference signal (CR_AF) from the high-frequency component processor 22 or the chrominance difference signal (R-Y) from the camera-signal processor 12. Likewise, the switching circuit 24 selects and outputs either the chrominance difference signal (CB_AF) or the chrominance difference signal (B-Y).

When a user requires focus adjustments, the on/off control signal is sent from an operation unit 20 (FIG. 1) to the switching circuits 23 and 24 via the micro computer 21. The switching circuits 23 and 24 select the chrominance difference signals (CR_AF) and (CB_AF) and output them as the chrominance difference signals (R-Y) and (B-Y), respectively.

Figure 3:
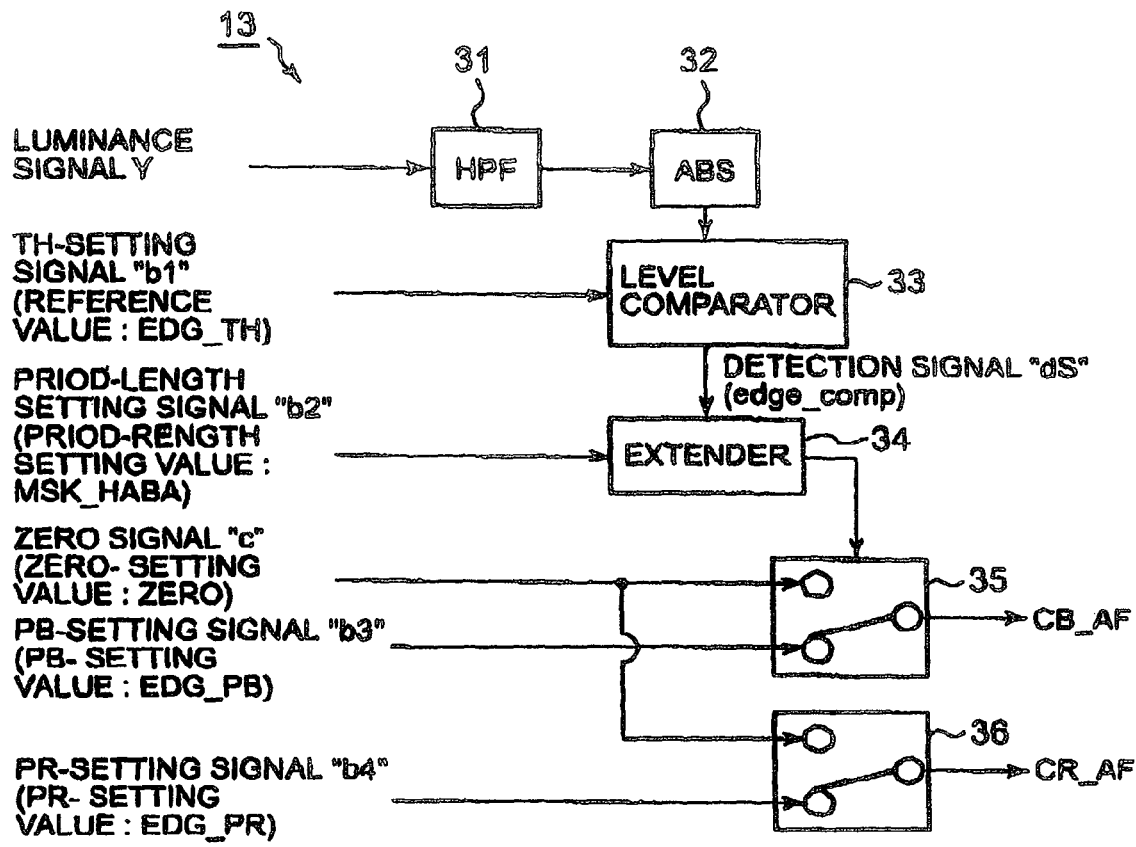
FIG. 3 shows an exemplary block diagram of a high-frequency component processor shown in FIG. 2.

FIG. 3 shows an exemplary block diagram of the high-frequency component processor 22.

In FIG. 3, the luminance signal Y from the camera-signal processor 12 (FIG. 1) is supplied to a high-pass filter (HPF) 31. The HPF 31 extracts a high-frequency component in the horizontal direction from the luminance signal Y, at or higher than a specific frequency that corresponds to the edge portion of an image of the object. The direction may be another direction, such as, the vertical direction.

The extracted high-frequency component is supplied to an absolute-value processor (ABS) 32 for calculation of an absolute value of the high-frequency component. The absolute value is supplied to a level comparator 33.

The level comparator 33 compares the absolute value of the high-frequency component with a reference value (EDG_TH) to output a detection signal ds (edge_comp). The reference value (EDG_TH) is carried by a TH-setting signal b1 supplied from the micro computer 21 (FIG. 1).

The level comparator 33 outputs a detection signal ds having a high level H when the absolute value of the high-frequency components is equal to or higher than the reference value (EDG_TH) whereas a detection signal ds having a low level L when the former is lower than the latter.

The detection signal ds is supplied to an extender 34 (which will be described later) and output as a detection signal ds' after processed by the extender 34. The detection signal ds' is then supplied to switching circuits 35 and 36.

Three types of signals are supplied to the switching circuits 35 and 36 from the micro computer 21: a zero signal "c" that carries a zero-setting value Zero for achromatic color, supplied to both of the switching circuits 35 and 36; a PB-setting signal b3 that carries a PB-setting value (EDG_PB) for giving a specific color to an image, supplied to the switching circuit 35; and a PR-setting signal b4 that carries a PR-setting value (EDG_PR) for giving a specific color to an image, supplied to the switching circuit 36.

The switching circuits 35 and 36 select the PB-setting value (EDG_PB) and the PR-setting value (EDG_PR), respectively, when a detection signal ds' having a high level H is supplied from the extender 34 whereas select the zero-setting value Zero when a detection signal ds' having a low level L is supplied.

When no focus adjustments are required, the focus processor 13 works as follows: The switching circuits 23 and 24 (FIG. 2) select the chrominance difference signals (R-Y) and (B-Y), respectively, supplied from the camera-signal processor 12 (FIG. 1), under control by the on/off control signal "a" from the micro computer 21. In other words, the chrominance difference signals (R-Y) and (B-Y) are output from the focus processor 13, with no processing.

In contrast, when focus adjustments are required, the focus processor 13 works as follows: When the absolute value of the high-frequency component is equal to or higher than the reference value (EDG_TH) at the level comparator 33 (FIG. 3), the switching circuit 35 selects the PB-setting value (EDG_PB) and outputs a chrominance difference signal (CB_AF) that carries the value (EDG_PB) and the switching circuit 36 selects the PR-setting value (EDG_PR) and outputs a chrominance difference signal (CR_AF) that carries the value (EDG_PR). The chrominance difference signals (CR_AF) and (CB_AF) are supplied to the switching circuits 23 and 24 (FIG. 2), respectively. The circuits 23 and 24 select the chrominance difference signals (CR_AF) and (CB_AF), respectively, as a focus-adjustment signal, under control by the on/off control signal "a" from the micro computer 21. This is the mechanism of the generation of a focus-adjustment signal based on the high-frequency components of the luminance signal Y.

The luminance signal Y and focus-adjustment signal in the HD-signal range are down-converted by the down-converter 14, so that a black-and-white image in the SD-signal range, colored with a specific color, is displayed through the VF/LCD display circuitry 18.

In-focus under the correct focus adjustments is a state in which the high-frequency components of the luminance signal Y in the horizontal direction are obtained most, for which the absolute value is equal to or higher than the reference value (EDG_TH), as described above. This state gives the edge portions the highest area ratio to an image on VF or LCD. Focus adjustments can be done manually with a focus ring (not shown).

Discussed here is a situation in which it is only for one pixel that the high-frequency components of the luminance signal Y in the horizontal direction are detected through the processing at the HPF 31, the ABS 32 and the level comparator 33 shown in FIG. 3. Such few high-frequency components could be lost through down conversion from the HD- to SD-signal range at the down converter 14. The loss of high-frequency components is equal to out-of-focus at the VF/LCD display circuitry 18, resulting in incorrect focus adjustments.

Then, as shown in FIG. 3, the high-frequency components processor 22 is equipped with the extender 34 so that the high-frequency components discussed above cannot be lost through down conversion.

Figure 4:
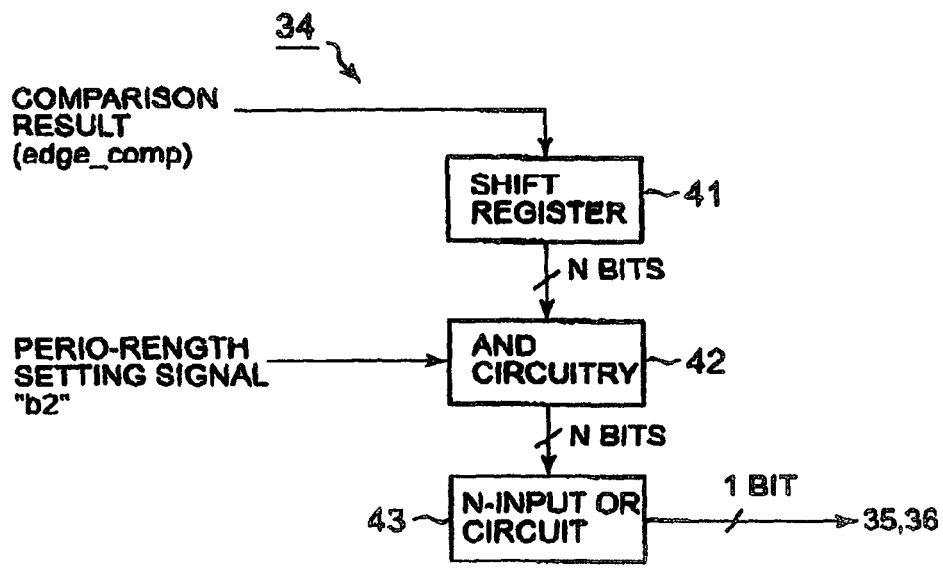
FIG. 4 shows an exemplary block diagram of an extender shown in FIG. 3.

FIG. 4 shows an exemplary block diagram of the extender 34.

Supplied sequentially to the extender 34 are 1-bit detection signals ds carrying a high-level value H or a low-level value L that indicates a comparison result (edge_comp) at the level comparator 33 (FIG. 3). Also supplied to the extender 34 is a period-length setting signal b2 from the micro computer 21 (FIG. 1), that carries a preset period-length setting value (MSK_HABA) that gives the number of high-level 1-bit detection signals ds to be output sequentially.

In FIG. 4, detection signals ds that carries a comparison result (edge_comp) of the level comparator 33 is stored in an N-bit shift register 41, N times sequentially. Extension over one pixel requires an integer of 2 or more for N. N-bit output signals of the shift register 41 are then ANDed with the period-length setting signal b2 from the micro computer 21 at AND circuitry (an AND logic unit) 42 that actually consists of many AND circuits, thus N-bit signals being output that carry a high level H only for specific bits among the N bits, depending on the period-length setting value ((MSK_HABA) carried by the period-length setting signal. The N-bit output signals are then ORed at an N-input OR circuit 43 and output as the detection signal ds' that carries a high level H, the period thereof being extended over one pixel.

Figure 5:
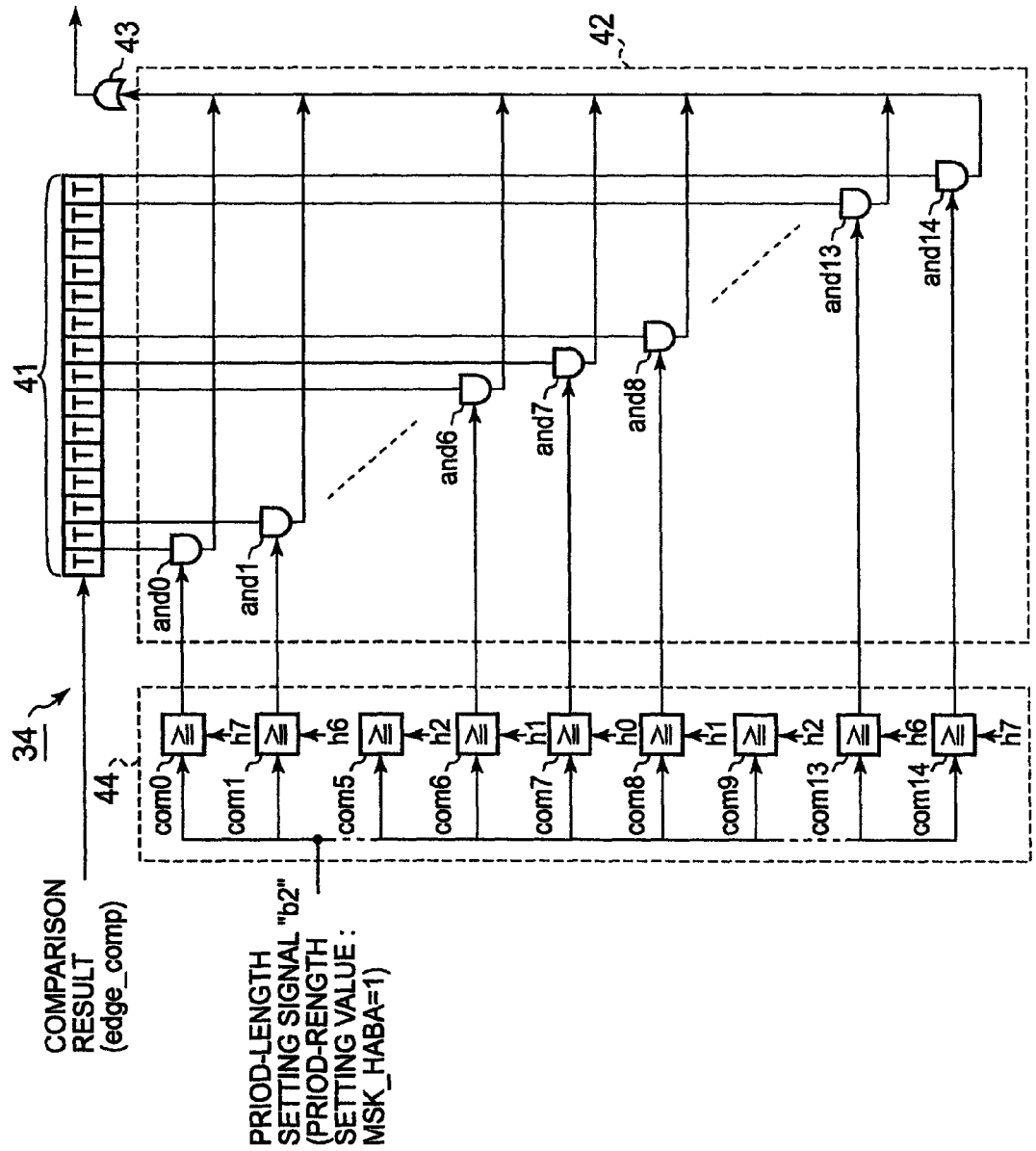
FIG. 5 shows an exemplary detailed block diagram of the extender shown in FIG. 3.

Shown in FIG. 5 is an exemplary detailed block diagram of the extender 34. The elements in FIG. 5 that are analogous to or the same as those in FIG. 4 are given the same reference numerals and the explanation thereof is omitted.

The extender 34 shown in FIG. 5 includes: an N-bit shift register 41; AND circuitry (an AND logic unit) 42 having an N number of 2-input AND circuits; an N-input OR circuit (an OR logic unit) 43; and comparator circuitry 44 having an N number of comparators. The number N is 15 in this example.

Each of the 15 comparators (com0 to com14) of the comparator circuitry 44 compares a preset value CO (hx) and the preset period-length setting value (MSK_HABA) carried by the period-length setting signal b2 from the micro computer 21 (FIG. 1). The suffix "x" added to the preset value CO (hx) is from 0 to 7, when the number N is 15, as shown in FIG. 5. Preset values CO (h0) to CO (h7) have values of 0, 1, . . . , 7, respectively. The preset values CO (h0), CO (h1), and CO (h2) are supplied to the comparator com7, the comparators com6 and com8, and the comparators com5 and com9, respectively. In the same way, the preset values CO (h3) to CO (h6) are supplied to the corresponding comparators, and the preset value CO (h7) is supplied to the comparators com0 and com14.

When the preset period-length setting value (MSK_HABA) is 1 (MSK_HABA=1), a high level H of the detection signal ds that carries a comparison result (edge_comp) supplied from the level comparator 33 (FIG. 3) is extended by one period before and after the period of the high level H. The extended signal is then supplied to the switching circuits 35 and 36, as the detection signal ds'. This means that when there is a pixel having a high level H (as a result of detection of a high-frequency component of the specific frequency or higher), the same level H can be given to one pixel on each side of that pixel in the horizontal direction, at MSK_HABA=1. Likewise, a high level H can be given to two pixels on each side of that pixel in the horizontal direction, when MSK_HABA is 2. The preset period-length setting value (MSK_HABA) can be varied via the micro computer 21.

Each comparator (com0 to com14) outputs a period-length setting signal b2 carrying a preset period-length setting value (MSK_HABA) of 1 at MSK_HABA≧hx whereas 0 at MSK_HABA<hx. Thus, the signal b2 output from each of the comparators (com6 to com8) carries the value (MSK_HABA) of 1. In contrast, the signal b2 output from each of the comparators (com0 to com5 and com9 to com14) carries the value (MSK_HABA) of 0.

The period-length setting signals b2 carrying a preset period-length setting value (MSK_HABA) are ANDed with the output signals of the shift resister 41, at the fifteen 2-input AND circuits of the AND circuitry 42. The signals b2 that carry the value (MSK_HABA) of 1 allows detection signals ds stored in the shift resister 41 to pass though the AND circuitry 42. In contrast, the signals b2 that carry the value (MSK_HABA) of 0 do not allow any detection signals ds to pass though the AND circuitry 42, or signals carrying a low level L are output from the AND circuitry 42. In other words, when there are detection signals ds that carry a high level H, the three 2-input AND circuits (and6 to and8) output detection signals ds that carry a high level H whereas the other twelve 2-input AND circuits (and0 to and5 and and9 to and14) output signals that carry a low level L.

Figure 6:
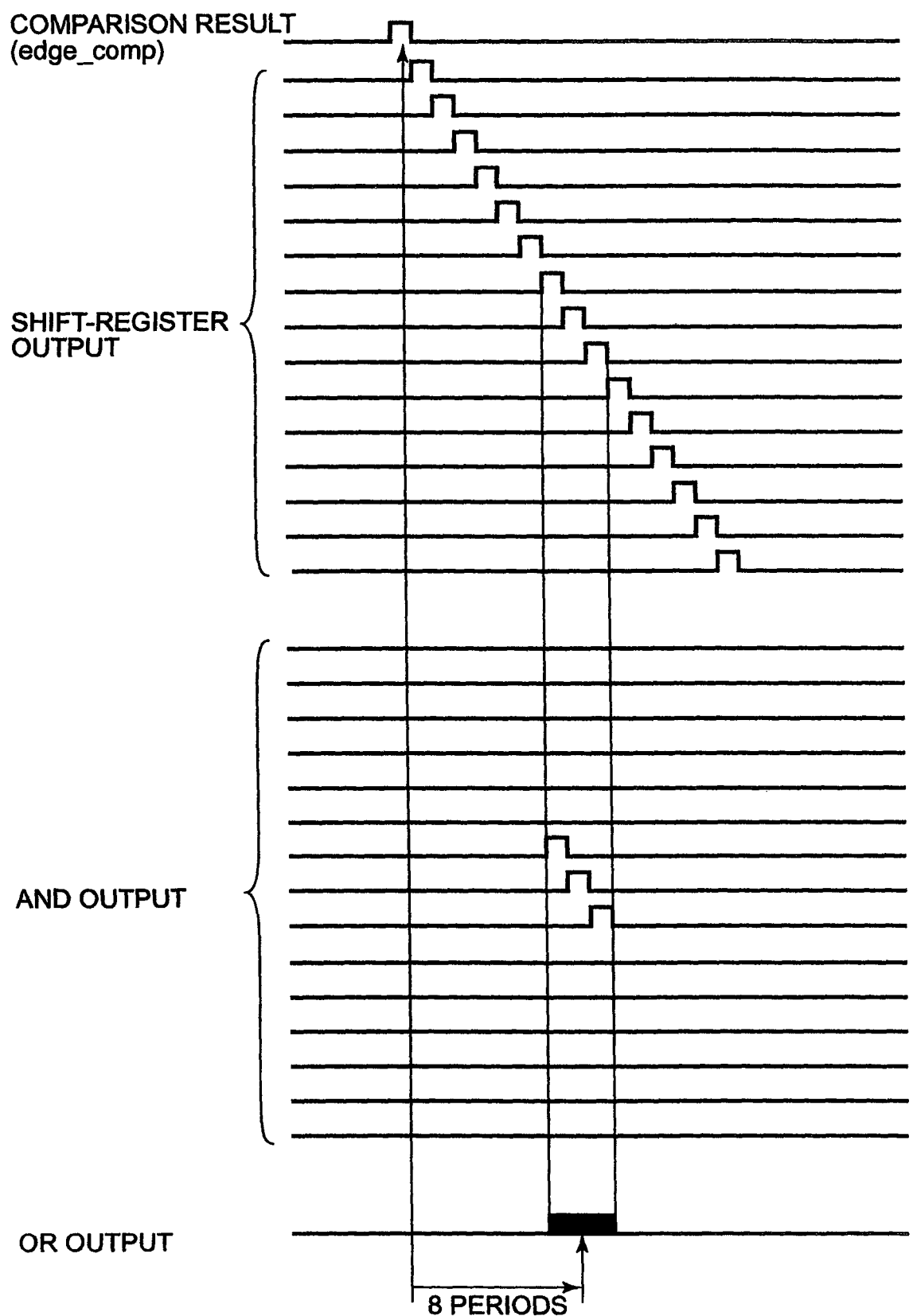
FIG. 6 shows one example of a timing chart that indicates the functions of the extender shown in FIGS. 4 and 5.

Shown in FIG. 6 is one example of a timing chart that indicates the functions of the extender 34 shown in FIGS. 4 and 5.

COMPARISON RESULT (edge_comp) shown in FIG. 6 is a comparison result (edge_comp) and indicates that only one pixel has a high level H (as a result of detection of a high-frequency component of the specific frequency or higher). This comparison result (edge_comp) is carried by a 1-bit detection signal ds as having a high level H that is supplied to the shift resister 41 from the level comparator 33 (FIG. 3), indicating that only one pixel has a high level H.

The 1-bit detection signal ds is delayed by one period at each of shift resisters T (FIG. 5) and stored therein. The stored signals are output as 15-bit signals (SHIFT-RESISTER OUTPUT shown in FIG. 6).

The 15-bit signals are supplied to the AND circuitry 42 (and0 to and14) which then outputs signals (AND OUTPUT shown in FIG. 6). In detail, when the period-length setting signal b2 is supplied the AND circuitry 42, detection signals ds for 3 bits (the seventh, eighth and ninth bits) supplied from the shift resister 41 are output from the AND circuits and6 to and8, respectively, as having a high level H.

All of the 15-bit detection signals ds including those for the seventh, eighth and ninth bits and having a high-level signal H are supplied to the N-input NOR circuit 43 (N=15), added to each other and output therefrom as a 1-bit signal OR OUTPUT as shown in FIG. 6. The signal OR OUTPUT indicates that the period of the detection signal ds having a high level H is delayed by 8 periods and extended by 1 period (before and also after that period) to 3 periods. The signal OR OUTPUT is then supplied to the switching circuits 35 and 36 (FIG. 3), as the detection signal ds' having the high level H for the 3 bits and the low level L for the other bits. This detection signal ds' is produced based on the detection signal ds that is supplied to the shift resister 41 and delayed by 8 periods. And, this period-extended detection signal ds' indicates that a high-frequency component is detected for each of the three consecutive pixels even though the original detection signal ds indicates that a high-frequency component is detected only for one pixel.

Figure 7:
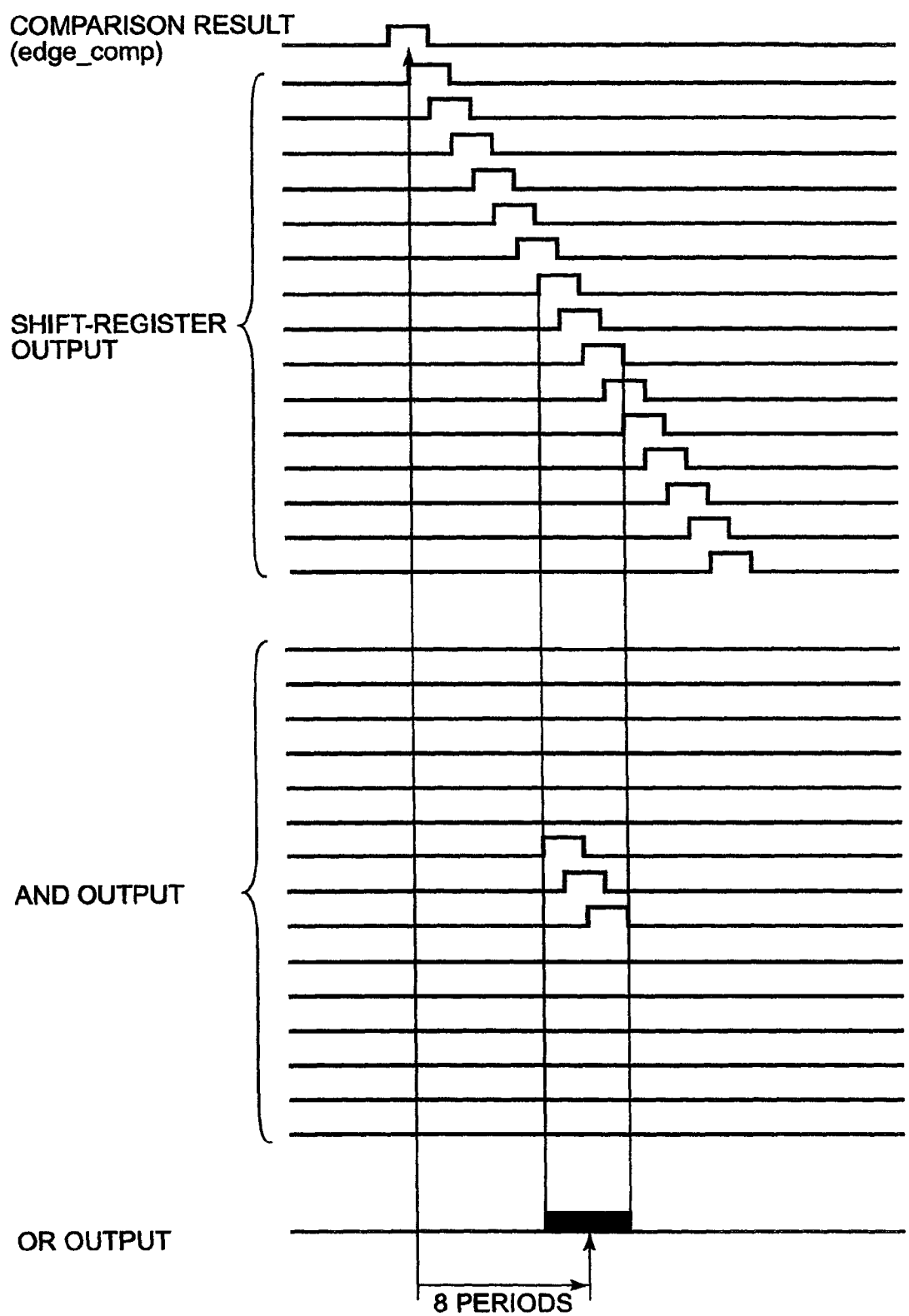
FIG. 7 shows another example of a timing chart that indicates the functions of the extender shown in FIGS. 4 and 5.

Shown in FIG. 7 is another example of a timing chart that indicates the functions of the extender 34 shown in FIGS. 4 and 5.

COMPARISON RESULT (edge_comp) shown in FIG. 7 is a comparison result (edge_comp) and indicates that adjacent two pixels have a high level H (as a result of detection of a high-frequency component of the specific frequency or higher). SHIFT-RESISTER OUTPUT shown in FIG. 7 indicates 15-bit signals output from the shift resister 41. AND OUTPUT shown in FIG. 7 indicates 15-bit output signals of the AND circuitry 42. OR OUTPUT indicates the output signal of the OR circuit 43.

The operation principle in FIG. 7 is the same as explained with reference to FIG. 6 for the situation in that a frequency component is detected only for one pixel.

In summary, the period (2 periods) for the detection signal ds having a high level H is delayed by 8 periods and extended by 1 period (before and also after that period) to 4 periods. The signal OR OUTPUT is then supplied to the switching circuits 35 and 36, as the detection signal ds' having high and low levels H and L. This detection signal ds' is produced based on the detection signal ds that is supplied to the shift resister 41 and delayed by 8 periods. And, this period-extended detection signal ds' indicates that a high-frequency component is detected for four consecutive pixels even though the original detection signal ds indicates that a high-frequency component is detected for adjacent two pixels.

Accordingly, even if a high-frequency component of a luminance signal is detected only for one pixel (or two adjacent pixels) at an edge portion of an image, the extender 34 outputs a detection signal that indicates such a high-frequency component is detected for more than one pixel (or two pixels), depending on the preset period-length setting value (MSK_HABA). The output signal of the extender 34 thus carries a high-frequency component even after subjected to down conversion at the down converter 14 that is located after the focus processor 13 in the entire camera system, as shown in FIG. 1.

As disclosed above, according to the first embodiment, the focus-adjustment signal carrying the luminance signal Y and the chrominance difference signals (R-Y) and (R-B) generated by the focus processor 13 in the HD-signal range is down-converted to an SD signal by the down-converter 14. The down-converted SD signal is converted into R, G and B signals by the RGB-matrix processor 16 with a specific matrix operation formula.

The R, G and B signals are supplied to the VF/LCD display circuitry 18 for displaying an image. The displayed image is a focus-adjustment image which is a black-and-white image in the SD-signal range, given a specific color at the edge portions. Therefore, a user can perform focus adjustments based on the focus-adjustment signal produced from an HD signal which does not lose high-frequency components.

Moreover, the first embodiment does not require an RGB converter for the focus-adjustment signal generating apparatus, thus achieving smaller size of circuitry with no redundancy of system processing.

Furthermore, the first embodiment employing the extender 34 does not loose high-frequency components even after down conversion at a lower area ratio of edge portions to one frame of image on VF or LCD, thus offering accurate focus adjustments.

[Second Embodiment]

Figure 8:
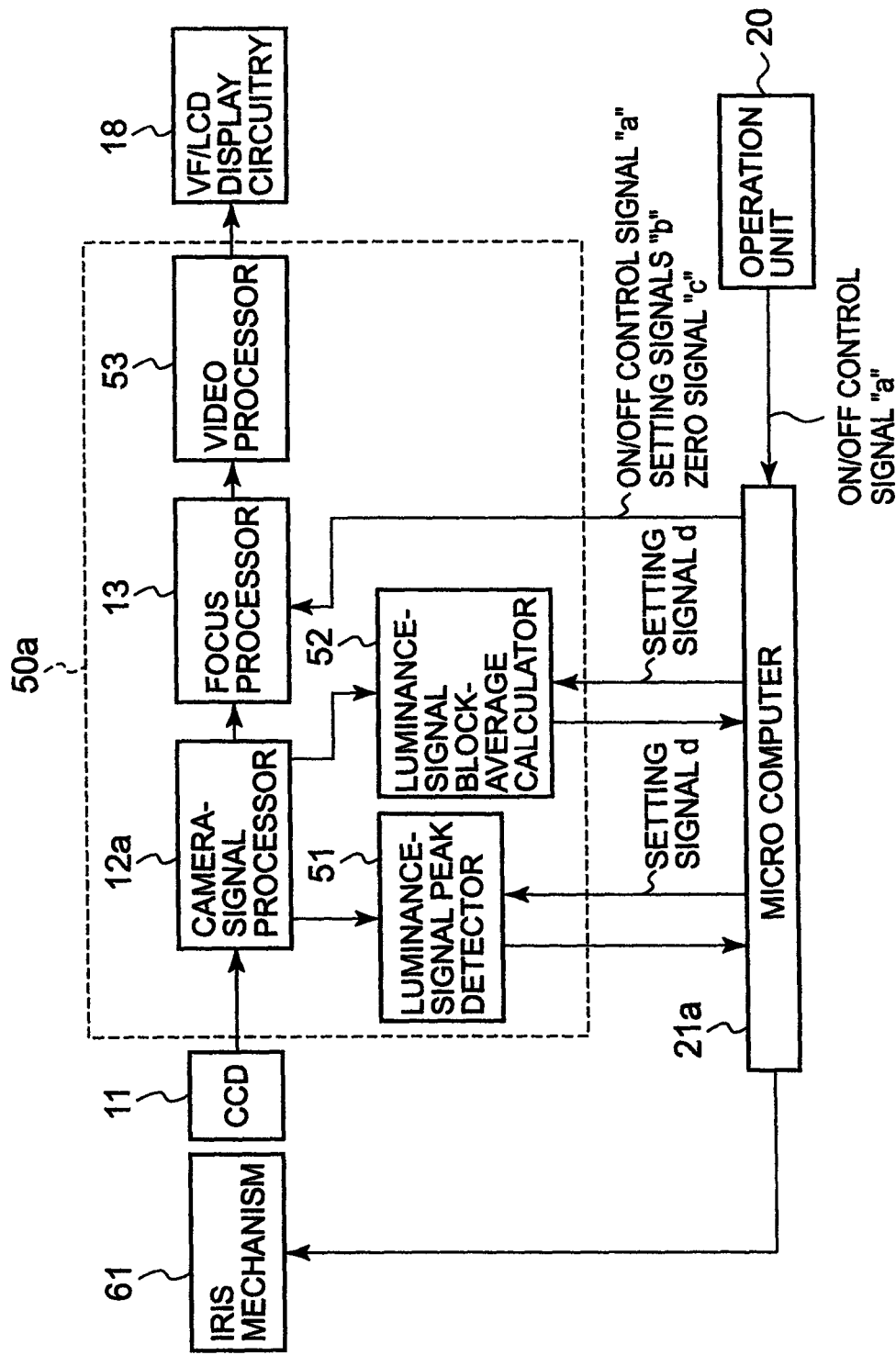
FIG. 8 shows a block diagram of a second embodiment of an imaging apparatus according to the present invention.

FIG. 8 shows a block diagram of a second embodiment of an imaging apparatus according to the present invention. In FIG. 8, the elements analogous to or the same as those shown in FIG. 1 are given the same reference numerals and the detailed explanation thereof is omitted.

An incident light beam from an object (not shown) is subjected to light-amount control by an iris mechanism 61 with an F-number under control by a micro computer 21a. The light-amount-controlled beam is supplied to a CCD 11 to be converted into a high-resolution HD signal by photoelectric conversion. The HD signal is supplied to a camera-signal processor 12a.

A luminance signal Y generated by the camera-signal processor 12a is supplied to a luminance-signal peak detector 51 and also a luminance-signal block-average calculator 52.

The luminance-signal peak detector 51 and the luminance-signal block-average calculator 52 are used for automatic exposure (AE) with AE data supplied by the micro computer 21a. Initial settings of the detector 51 and the calculator 52 are done with a setting signal "d" from the micro computer 21a. The detector 51 and the calculator 52 are also used in the first embodiment for AE but not shown in FIG. 1 because AE is not related to the essential function of the first embodiment.

The second embodiment is also provided with a focus processor 13 and a video processor 53. The focus processor 13 is equipped with several circuit elements identical to those shown in FIGS. 2 and 3. The video processor 53 is equipped with a down converter 14, a color encoder 15 and an RGB-matrix processor 16 identical to those shown in FIG. 1.

The camera-signal processor 12a, the focus processor 13, the luminance-signal peak detector 51, the luminance-signal block-average calculator 52, and the video processor 53 constitute a camera processing LSI (Large Scale Integrated Circuit) 50a.

Supplied to a high-frequency component processor 22, identical to that shown in FIG. 3, from the micro computer 21a are several setting signals "b", such as, a TH-setting signal b1 that carries a reference value (EDG_TH) and a period-length setting signal b2 that carries a preset period-length setting value (MSK_HABA).

In the second embodiment, different from the first embodiment, the reference value (EDG_TH) is decided by calculation using data that is basically used for AE and preset in the micro computer 21a, to achieve highly accurate detection of high-frequency components which is otherwise affected by difference in images.

Figure 9:
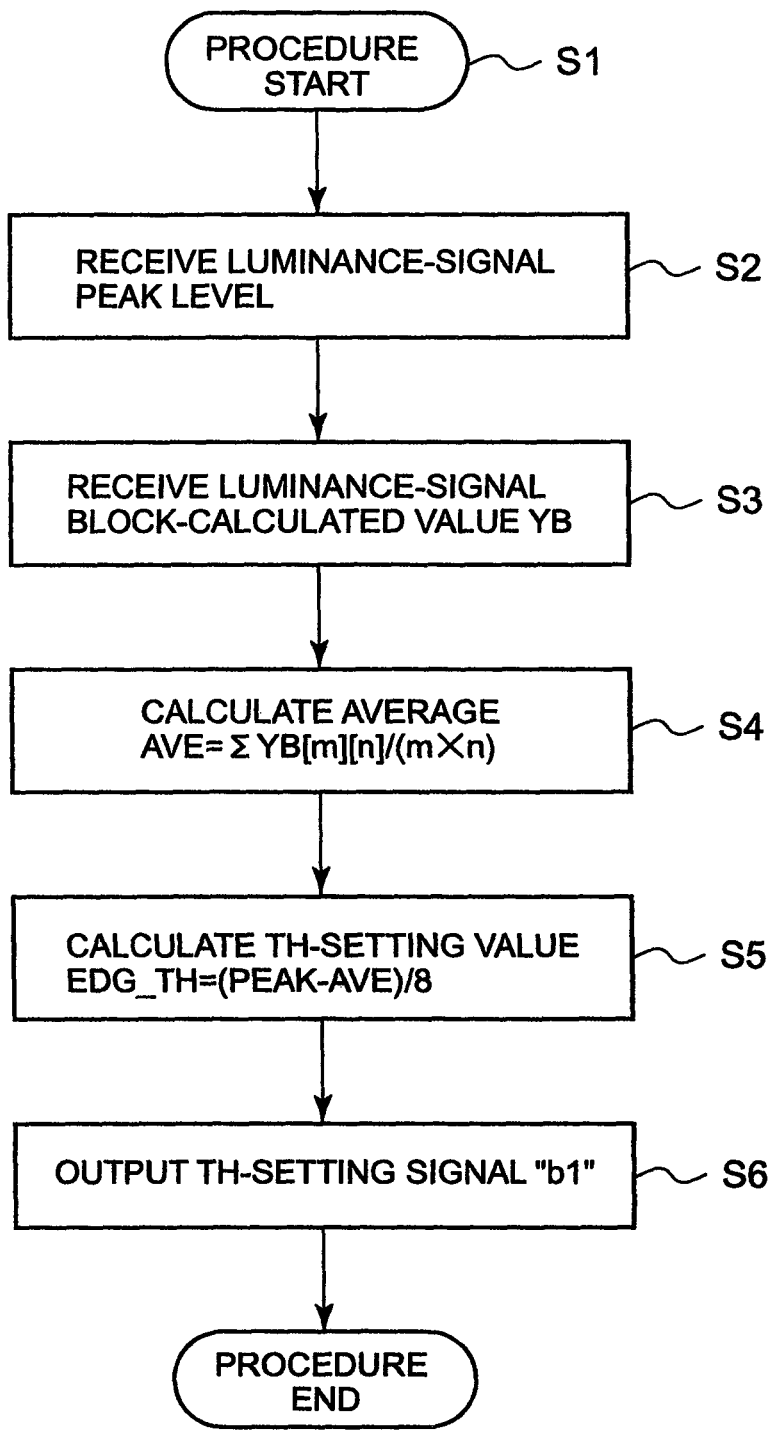
FIG. 9 shows a control procedure of a micro computer shown in FIG. 8.

A control procedure of the micro computer 21a is explained with reference to a flow chart shown in FIG. 9.

When the procedure starts (step S1), the micro computer 21a receives a peak level (PEAK) of a luminance signal Y detected by the luminance-signal peak detector 51 (step S2). The peak level (PEAK) is the maximum level or value of a luminance signal Y in one frame of image.

The micro computer 21a also receives a luminance-signal block-calculated value YB[m][n] from the luminance-signal block-average calculator 52 (step S3). One frame of image is divided into an "m" number of blocks and an "n" number of blocks in the horizontal and vertical directions, respectively, ("m" and "n" being a natural number of 2 or more). The average of luminance signals in each of the (m×n) number of blocks is the luminance-signal block-calculated value YB[m][n]. The value YB[m][n] is basically obtained for AE.

The micro computer 21a (an arithmetic unit) calculates an average (AVE) of luminance signals in one frame of image using the luminance-signal block-calculated value YB[m][n] (step S4), according to the following expression (1):

$$\text{AVE} = \Sigma YB[m][n]/(m \times n) \tag{1}$$

here, $\Sigma YB[m][n]$ is the total sum of the luminance-signal block-calculated value YB[m][n].

The micro computer 21a calculates a reference value (a TH-setting value, EDG_TH) (step S5), according to the following expression (2), using the peak level (PEAK) and the average (AVE):

$$\text{EDG\_TH} = \text{PEAK} - \text{AVE}/8 \tag{2}$$

here, the value "8" is experimentally obtained, which can be dynamically varied depending on images, to achieve highly accurate detection of high-frequency components which is otherwise affected by difference in images.

The micro computer 21a supplies a TH-setting signal "b1" that carries the reference value (EDG_TH) obtained as described above to the level comparator 33 (step S6), and ends the procedure (step S7).

In the second embodiment, the reference value EDG_TH can be varied depending on images, so that dynamic detection of high-frequency components of a luminance signal in the horizontal direction is achieved at the level comparator 33 of the focus processor 13.

Although the two embodiments are disclosed, the present invention is not limited to those. For example, instead of down conversion from HD to SD signals as described, the present invention is applicable even when the resolution of a video signal obtained through image taking and that of VF or LCD are different from each other. Other options are: calculation of the reference value EDG_TH based on the average of luminance signals only, instead of the peak level and the average as described; and calculation of the peak level and the average with integral on images taken for a specific period, instead of through one frame of image as described.

As disclosed above in detail, the present invention has the following advantages:

Use of luminance and chrominance difference signals for generation of a focus-adjustment signal omits an RGB coveter dedicated for generation of this signal, thus achieving smaller size of circuitry with no redundancy of system processing.

Even if high-frequency components are detected for an extremely short period (such as, just for one pixel) from the edge portions of an image, the detected high-frequency components are treated as if the components are detected for several pixels (period extension in the embodiments), thus accurate focus adjustments being achieved even after down conversion.

The reference value EDG_TH can be varied depending on images, so that dynamic detection of high-frequency components of luminance signals in the horizontal direction is achieved irrespective of difference in images.

What is claimed is:

1. A focus-adjustment signal generating apparatus comprising:
   a filter configured to extract a high-frequency component at a specific frequency or higher from a luminance signal of an input video signal;
   a level comparator configured to compare an absolute value of the high-frequency component with a specific reference value, to output a first detection signal when the absolute value is equal to or larger than the reference value whereas to output a second detection signal when the absolute value is smaller than the reference value;
   an extender configured to extend a first output period from output start to output end during which the first detection signal is output to a second output period from output start to output end longer than the first output period by changing a first number of output times of the first detection signal to a second number of output times larger than the first number of output times based on an input period-setting signal, thereby outputting a third detection signal having the second output period thus extended; and
   a focus-adjustment signal generator configured to select a first chrominance difference signal indicating a specific color in response to the third detection signal and to consecutively output the selected first chrominance difference signal during the second output period thus extended whereas to select a second chrominance difference signal indicating an achromatic color in response to the second detection signal and to output the selected second chrominance difference signal, the output first or second chrominance difference signal being generated as a manual focus-adjustment signal.

2. An imaging apparatus comprising:
   a video signal generator configured to take an image of an object and generate a video signal carrying the image;
   a filter configured to extract a high-frequency component at a specific frequency or higher from a luminance signal of the video signal;
   a comparator configured to compare an absolute value of the high-frequency component with a specific reference value, to output a first detection signal when the absolute value is equal to or larger than the reference value whereas to output a second detection signal when the absolute value is smaller than the reference value;
   an extender configured to extend a first output period from output start to output end during which the first detection signal is output to a second output period from output start to output end longer then the first output period by changing a first number of output times of the first detection signal to a second number of output times larger than the first number of output times based on an input period-setting signal, thereby outputting a third detection signal having the second output period thus extended;
   a focus-adjustment signal generator configured to select a first chrominance difference signal indicating a specific color in response to the third detection signal and to consecutively output the selected first chrominance difference signal during the second output period thus extended whereas to select a second chrominance difference signal indicating an achromatic color in response to the second detection signal and to output the selected second chrominance difference signal, the output first or second chrominance difference signal being generated as a focus-adjustment signal;
   a down converter configured to down-convert the focus-adjustment signal by decreasing at least either the number of lines in a vertical direction or the number of pixels in a horizontal direction of the focus-adjustment signal;
   a display configured to display an image of the object with the specific color at an edge portion of the image by means of the down-converted focus-adjustment signal.

3. The imaging apparatus according to claim 2, wherein the down converter down-converts the focus-adjustment signal in a high-vision signal range to a signal in a standard-resolution signal range.

4. A method of generating a manual focus-adjustment signal comprising the steps of:
   extracting a high-frequency component at a specific frequency or higher from a luminance signal of an input video signal;
   comparing an absolute value of the high-frequency component with a specific reference value, to output a first detection signal when the absolute value is equal to or larger than the reference value whereas to output a second detection signal when the absolute value is smaller than the reference value;
   extending a first output period from output start to output end during which the first detection signal is output to a second output period from output start to output end longer than the first output period by changing a first number of the output times of the first detection signal to a second number of output times larger than the first number of output times based on an input period-setting signal, thereby outputting a third detection signal having the second output period thus extended; and
   selecting a first chrominance difference signal indicating a specific color in response to the third detection signal and consecutively outputting the selected first chrominance difference signal during the second output period thus extended whereas selecting a second chrominance difference signal indicating an achromatic color in response to the second detection signal and outputting the selected second chrominance difference signal, the output first or second chrominance difference signal being generated as a manual focus-adjustment signal.

5. An imaging method comprising the steps of:
   taking an image of an object and generating a video signal carrying the image;
   extracting a high-frequency component at a specific frequency or higher from a luminance signal of the video signal;

comparing an absolute value of the high-frequency component with a specific reference value, to output a first detection signal when the absolute value is equal to or larger than the reference value whereas to output a second detection signal when the absolute value is smaller than the reference value;

extending a first output period from output start to output end during which the first detection signal is output to a second output period from output start to output end longer than the first output period by changing a first number of output times of the first detection signal to a second number of output times larger than the first number of output times based on an input period-setting signal, thereby outputting a third detection signal having the second output period thus extended;

selecting a first chrominance difference signal indicating a specific color in response to the third detection signal and consecutively outputting the selected first chrominance difference signal during the second output period thus extended whereas selecting a second chrominance difference signal indicating an achromatic color in response to the second detection signal and outputting the selected second chrominance difference signal, the output first or second chrominance difference signal being generated as a manual focus-adjustment signal;

down-converting the focus-adjustment signal by decreasing at least either the number of lines in a vertical direction or the number of pixels in a horizontal direction of the focus-adjustment signal and displaying an image of the object with the specific color at an edge portion of the image by means of the down-converted focus-adjustment signal.

6. The imaging method according to claim 5, wherein the focus-adjustment signal in a high-vision signal range is down-converted to a signal in a standard-resolution signal range.

* * * * *